United States Patent
Sivabalan et al.

(10) Patent No.: US 9,503,363 B2
(45) Date of Patent: Nov. 22, 2016

(54) SEGMENT ROUTING LABEL SWITCH PATHS IN NETWORK FUNCTIONS VIRTUALIZATION COMMUNICATIONS NETWORKS

(71) Applicant: CISCO TECHNOLOGY, INC., San Jose, CA (US)

(72) Inventors: Muthurajah Sivabalan, Kanata (CA); Sami Boutros, Dublin (CA); Clarence Filsfils, Brussels (BE); Rex Emmanuel Fernando, Dublin (CA); Lakshmi Sharma, Saratoga, CA (US); Santiago Vazquez Freitas, Feltham (ES); Bruce McDougall, Anacortes, WA (US); Robert Keith Fielding, Castle Rock, CO (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 73 days.

(21) Appl. No.: 14/659,220

(22) Filed: Mar. 16, 2015

(65) Prior Publication Data

US 2016/0277290 A1    Sep. 22, 2016

(51) Int. Cl.
    *H04L 12/28*    (2006.01)
    *H04L 12/723*   (2013.01)
    *H04L 12/911*   (2013.01)
    *H04L 29/12*    (2006.01)

(52) U.S. Cl.
    CPC ............ *H04L 45/50* (2013.01); *H04L 47/825* (2013.01); *H04L 61/2007* (2013.01)

(58) Field of Classification Search
    CPC combination set(s) only.
    See application file for complete search history.

(56) References Cited

U.S. PATENT DOCUMENTS

| | | |
|---|---|---|
| 6,381,646 B2 | 4/2002 | Zhang |
| 6,778,524 B1 | 8/2004 | Augart |
| 7,043,564 B1 | 5/2006 | Cook |
| 7,496,105 B2* | 2/2009 | Vasseur .............. H04L 45/04 370/248 |
| 7,543,052 B1 | 6/2009 | Cesa Klein |
| 7,672,236 B1 | 3/2010 | Karunakaran |
| 7,738,469 B1 | 6/2010 | Shekokar et al. |
| 7,784,055 B2 | 8/2010 | Srivastava |
| 8,767,757 B1 | 7/2014 | Chudgar |

(Continued)

FOREIGN PATENT DOCUMENTS

WO    WO2016/007274    1/2016

OTHER PUBLICATIONS

Technical Report, Carrier Software Defined Networking (SDN), Fujitsu, 140 pages, Mar. 2014.*

(Continued)

*Primary Examiner* — Frank Duong
(74) *Attorney, Agent, or Firm* — Patent Capital Group

(57) ABSTRACT

A method is provided in one example embodiment and includes receiving a request to create a path through a network, wherein the path originates on a first network device and terminates on the second network device; identifying a first controller associated with the first network device, wherein the first controller proxies control plane functions for the first network device; identifying a second controller associated with the second network device, wherein the second controller proxies control plane functions for the second network device; and computing the path using the first controller as a source and the second controller as a destination. The first controller installs the computed path on the first network device and the second controller installs the computed path on the second network device.

20 Claims, 9 Drawing Sheets

(56) References Cited

U.S. PATENT DOCUMENTS

| | | |
|---|---|---|
| 8,804,736 B1 | 8/2014 | Drake |
| 8,942,235 B1 | 1/2015 | Vinapamula |
| 2001/0051865 A1 | 12/2001 | Kerr et al. |
| 2003/0236913 A1 | 12/2003 | Hoban |
| 2006/0153225 A1 | 7/2006 | Kamiay |
| 2006/0187912 A1 | 8/2006 | Schwartz |
| 2007/0162968 A1 | 7/2007 | Ferreira |
| 2007/0248065 A1 | 10/2007 | Banerjea et al. |
| 2010/0150005 A1 | 6/2010 | Gerber |
| 2010/0284403 A1 | 11/2010 | Scudder |
| 2011/0080830 A1 | 4/2011 | Ko |
| 2011/0110373 A1 | 5/2011 | Ghosh |
| 2011/0131308 A1 | 6/2011 | Eriksson |
| 2012/0069740 A1* | 3/2012 | Lu .................... H04L 45/04 370/238 |
| 2012/0207175 A1 | 8/2012 | Raman |
| 2013/0155902 A1 | 6/2013 | Feng |
| 2013/0191552 A1 | 7/2013 | Patterson |
| 2013/0272305 A1 | 10/2013 | Lefebvre et al. |
| 2013/0290622 A1 | 10/2013 | Dey |
| 2013/0297798 A1 | 11/2013 | Arisoylu et al. |
| 2014/0098675 A1 | 4/2014 | Frost et al. |
| 2014/0169370 A1 | 6/2014 | Filsfils et al. |
| 2014/0215560 A1 | 7/2014 | Roberson |
| 2014/0269266 A1 | 9/2014 | Filsfils et al. |
| 2014/0269421 A1 | 9/2014 | Previdi et al. |
| 2014/0269698 A1 | 9/2014 | Filsfils et al. |
| 2014/0269721 A1 | 9/2014 | Bashandy et al. |
| 2014/0317259 A1 | 10/2014 | Previdi et al. |
| 2015/0052575 A1 | 2/2015 | Myla |
| 2015/0103844 A1* | 4/2015 | Zhao .................... H04L 45/42 370/410 |
| 2015/0319078 A1* | 11/2015 | Lee .................... H04L 12/6418 370/392 |
| 2016/0006654 A1 | 1/2016 | Fernando |

OTHER PUBLICATIONS

"OpenFlow Switch Specification," Feb. 28, 2011, XP055132070, Sections 2, 4.1.1 , http://archive.openflow.org/documents/openflow-spec-v1.1.0.pdf.

Fernando, R., et al., "Virtual Topologies for Service Chaining in BG/IP MPLS VPNs," Internet Draft draft-rfernando-advpn-service-chaining-04, Jul. 4, 2014; 18 pages.

Bitar, N., et al., "Interface to the Routing System I2RS) for Service Chaining: Use Cases and Requirements," Internet Engineering Task Force Internet Draft draft-bitar-i2rs-service-chaining-01, Feb. 14, 2014; 15 pages.

S. Sivabalan, et al., "PCE-Initiated Traffic Engineering Path Setup in Segment Routed Networks," Network Working Group, Internet Draft, Jun. 17, 2013, 16 pages; https://tools.ietf.org/html/draft-sivabalan-pce-segment-routing-00.

S. Sivabalan, et al., "PCEP Extensions for Segment Routing," Network Working Group, Internet-Draft, Jul. 12, 2013, 20 pages; https://tools.ietf.org/html/draft-sivabalan-pce-segment-routing-01.

* cited by examiner

SEGMENT ROUTING LABEL SWITCH PATHS IN NETWORK FUNCTIONS VIRTUALIZATION COMMUNICATIONS NETWORKS

TECHNICAL FIELD

This disclosure relates in general to the field of communications networks and, more particularly, to techniques for supporting segment routed label switched switch paths ("LSPs") in a network functions virtualization ("NFV") communications network.

BACKGROUND

In certain communications network environments, a control plane engine, such as an XR controller node, controls a set of forwarding engines, such as Virtual Provider Edge Forwarders ("VPEF") nodes, running on compute servers. The forwarding engines are connected to themselves as well as to other networks using Layer 2/Internet Protocol ("L2/IP") or Multi-Protocol Label Switching ("MPLS") fabric. Segment routing provides the ability to set up MPLS Label Switched Paths ("LSPs") without the need to deploy RSVP-TE or LDP signaling protocols and hence leads to simpler network operation, and better scalability and agility in setting up large numbers of LSPs. It is anticipated that Segment Routed Label Switched Paths ("SR LSPs") will become a preferred data transport method in NFV network architectures.

Additionally, service providers ("SPs") have been deploying RSVP signaled traffic engineering LSPs for many years to carry services such as L3VPN with quality of service ("QoS") guarantees and reliability using mechanisms like Fast ReRoute ("FRR") and path protection. Network operators offering cloud, web-server farm, and other services are also considering MPLS-TE solutions for transferring data among data centers ("DCs").

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS

Overview

Figure 1:
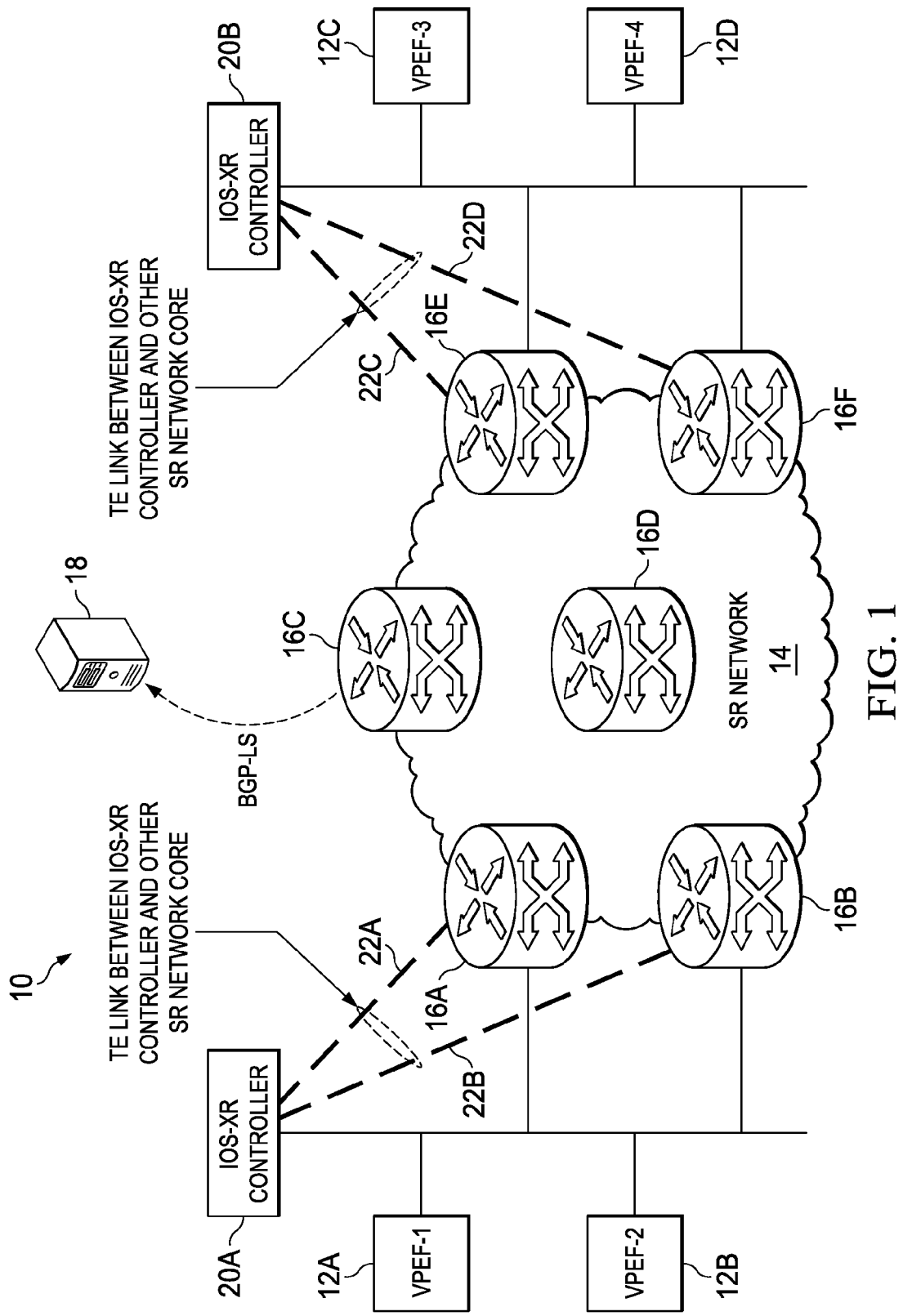
FIG. 1 is a simplified block diagram of an example network environment in which a system for supporting SR LSPs in an NFV network architecture may be implemented in accordance with embodiments described herein.

A method is provided in one example embodiment and includes receiving a request to create a path through a network, wherein the path originates on a first network device and terminates on the second network device; identifying a first controller associated with the first network device, wherein the first controller proxies control plane functions for the first network device; identifying a second controller associated with the second network device, wherein the second controller proxies control plane functions for the second network device; and computing the path using the first controller as a source and the second controller as a destination. The first controller installs the computed path on the first network device and the second controller installs the computed path on the second network device. In certain embodiments, the computed path is a Segment Routed Label Switched Path ("SR LSP") and the first controller installs the computed path on the first network device and any other network device for which it proxies control plane functions by programming thereon Multi-Protocol Label Switching ("MPLS") label forwarding entries for each known Internet Protocol ("IP") prefix learned via Interior Gateway Protocol ("IGP"). In certain embodiments, the computed path is a Traffic Engineering Segment Routed Label Switched Path ("SR-TE LSP") and the first controller installs the computed path on the first network device by programming thereon a Multi-Protocol Label Switching ("MPLS") label forwarding entry for the computed path. The MPLS label forwarding entry may include a stack of labels and the first controller may program the MPLS label forwarding entry on all network devices for which the first controller proxies control plane functions and through which data may be forwarded on the SR-TE LSP. The request may comprise a Path Computation Element Protocol ("PCEP") request.

In certain embodiments, a network node connected to the first network device receives a resource reservation packet addressed to the first network device, in which case the method may further include identifying that the first controller is associated with the first network device; updating the received resource reservation packet to change an IP address included in the resource reservation packet from an IP address of the first network device to an IP address of the first controller; and forwarding the updated resource reservation packet to the first controller for processing. In other embodiments, the method further includes maintaining a tunnel between the first network device and the first controller; receiving by the first network device a resource reservation packet addressed to the first network device; and forwarding the received resource reservation packet from the first network device to the first controller for processing.

Example Embodiments

Embodiments described herein cover systems and methods for establishing SR LSPs, with or without traffic engineering, that originate and/or terminate on a forwarding engine for implementing a data plane and for which control plane functions are proxied by an associated control plane engine. As will become apparent, the embodiments described herein cover both centralized (e.g., via SDN controller) or distributed path (e.g., head-end based) computation for SR LSPs. It will be noted that, while SR LSPs established as described herein may both originate and terminate on a forwarding engine for which control plane functions are proxied by a control plane engine, that need not necessarily be the case. In particular, such SR LSPs may originate on a forwarding engine for which control plane functions are proxied and terminate on a network device for which control plane functions are not proxied.

FIG. 1 illustrates a simplified block diagram of a network environment 10 in which a system for supporting SR LSPs in an NFV network architecture may be implemented in accordance with embodiments described herein. As shown in FIG. 1, the network environment 10 includes a plurality of forwarding engines, which may be implemented in certain embodiments as VPEFs, 12A-12D, interconnected via a segment routing ("SR") network 14. It will be noted that, while embodiments herein are described with reference to virtual forwarding engines, such forwarding engines may be implemented as physical forwarding engines as well. Each of forwarding engines 12A-12D implements only forwarding (i.e., data plane) functions; control plane functions for each of the engines are implemented via proxy as described in greater detail below. SR network 14 comprises a plurality of SR network nodes 16A-16F, which may be implemented using routers and which may be alternately referred to herein as "P-nodes." SR network 14 is similar to an MPLS network in that SR is based on label switching; however, MPLS labels are distributed by Interior Gateway Protocol ("IGP"), such as Open Shortest Path First ("OSPF") or Intermediate System to Intermediate System ("IS-IS"), and there is no need to deploy any signaling protocols to establish transport LSP. An SDN controller 18 is provided for learning the topology of the SR network 14 (e.g., via Border Gateway Protocol Link State Distribution or other means) and then providing a path through the network 14 from a source host to a destination host in response to a Service Level Agreement ("SLA") request from an SDN application. SR provides an ability to set up MPLS LSPs without the need to deploy RSVP-TE or LDP signaling protocols, leading to simpler network operation, better scalability, and more agility in setting up a large number of LSPs, making it suitable for SDN environments.

In accordance with features of embodiments described herein, one or more control plane engines comprising controllers 20A, 20B, are provided for proxying control plane functions for one or more of the forwarding engines 12A-12D. Controllers 20A, 20B, provide the necessary control plane functions to support virtual forwarders (e.g., forwarding engines 12A-12D) that do not have full control plane functions. In certain embodiments, controllers 20A, 20B, may be implemented as XR controllers.

For example, as shown in FIG. 1, XR controller 20A proxies control plane functions for (i.e., "handles," "is responsible for," and/or "is associated with") VPEFs 12A and 12B. Similarly, XR controller 20B proxies control plane functions for (i.e., "handles," "is responsible for," and/or "is associated with") VPEFs 12C and 12D. It will be assumed for the sake of embodiments described herein that the ability to advertise Segment IDs ("SIDs") for VPEFs via IGP exists in the environment 10. Embodiments described herein implement systems and methods for establishing SR LSPs, with or without TE, that originate and/or terminate on forwarding engines, such as VPEFs, for which control plane functions are proxied by one or more control plane engines, such as XR controllers. The embodiments described herein cover both centralized (e.g., via SDN controller 18) and distributed path (head-end-based) path computation for SR LSP.

Referring again to FIG. 1, for TE path computation purposes, virtual TE links 22A-22D may be created and advertised via link-state IGP and BGP. In the network environment 10, the required TE links between each of the VPEFs 12A-12D and the core of the SR network 14 originate/terminate on the XR controller responsible for the respective VPEF. For example, the controller 20A is responsible and terminates TE links 22A, 22B, for VPEFs 12A, 12B, while the controller 20B is responsible and terminates TE links 22C, 22D, for VPEFs 12C, 12D. In other words, a VPEF does not originate or terminate a TE link. As a result, the links 22A-22D are referred to as "virtual TE links". Virtual TE links are control plane entities. It will be noted that an SR LSP can follow the IGP-chosen path. When an SR LSP uses a Traffic Engineering path, which may or may not be the same as the IGP-chosen path, the LSP is referred to herein as "SE-TE LSP".

Figure 2:
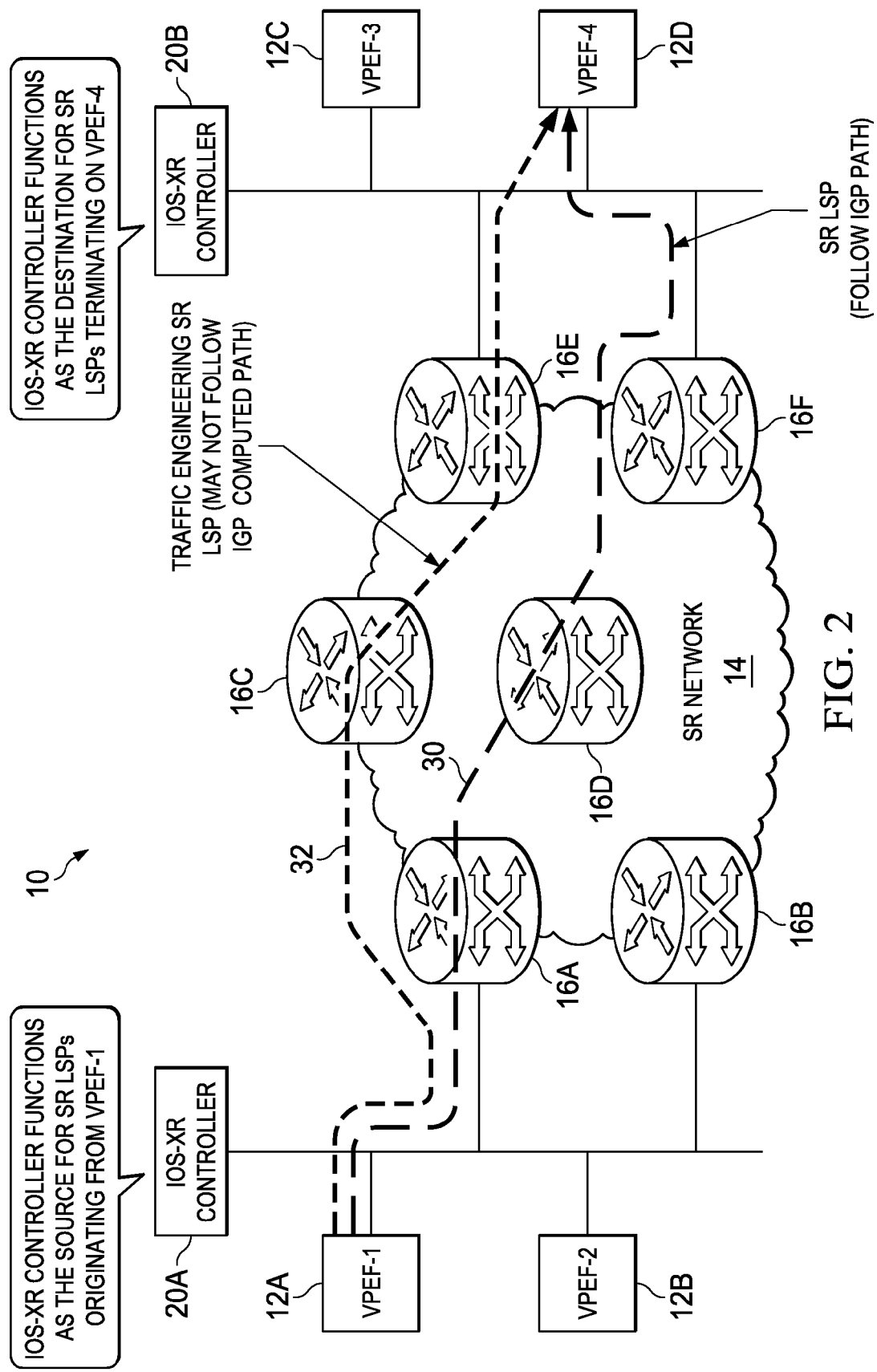
FIG. 2 is a simplified block diagram illustrating SR LSP with distributed path computation as may be implemented in the network environment illustrated in FIG. 1.

Referring now to FIG. 2, the same reference numerals are used to refer to the same/similar elements shown therein. As shown in FIG. 2, using distributed path computation, the XR controllers 20A, 20B, again function as the source and/or destination for SR LSPs originating and/or terminating on the VPEF(s) for which they are responsible. For example, in the embodiment shown in FIG. 2, XR controller 20A functions as the source/destination for SR LSPs originating/terminating on VPEFs 12A and 12B; XR controller 20B functions as the source/destination for SR LSPs originating/terminating on VPEFs 12C and 12D. In the embodiment shown in the FIGURES presented herein, including FIG. 2, it is assumed that VPEFs 12A-12D implement the necessary control plane supports for programming forwarding state and supporting MPLS forwarding operations (such as label push, pop, etc.), but do not run heavy control protocols such as IGP. This approach is followed for both IGP Shortest Path First ("SPF") (for SR LSPs) as well as Constrained SPF ("CSPF") (for SR-TE LSPs). In other words, each XR controller acts as the source/destination for SR LSP in the control plane while the SR LSP can originate or terminate on the VPEF in the data plane.

Referring again to FIG. 2, illustrated therein is an IGP-computed SR LSP, represented by a dashed line designated by a reference numeral 30, that originates at VPEF 12A and terminates at VPEF 12C. A SR-TE LSP, represented by a dashed line designated by a reference numeral 32, corresponding to IGP SR LSP 30 may follow a different path though the SR network 14. In accordance with embodiments described herein, and as previously noted, XR controller 20A serves as the source for both LSPs 30, 32, in the control plane, while XR controller 20B serves as the destination for both LSPs 30, 32, in the control plane.

It will be understood that SDN applications can request from a stateful Path Computation Element ("PCE"), which in the illustrated embodiments executes on SDN controller and is designated by a reference numeral 34, an SR LSP the source or destination of which may be a VPEF. In accordance with features of embodiments described herein, PCE may identify the SR controller controlling a given VPEF for CSPF purposes so that the XR controller is used as the source or destination of the path originating or terminating on a VPEF. It will be assumed for the sake of embodiments described herein that VPEF does not support PCE Protocol ("PCEP") or any other protocol used for communicating with PCE. It will be noted that the request for an SR LSP may be directed to one of the controllers 20A, 20B, which then in turn directs the request to the PCE and/or a Wide Area Network ("WAN") controller.

In general, PCE simplifies path computation by separating network topology determination from path creation. Historically, both of these tasks have been performed by the provider edge router that receives the customer path request (i.e., the "head-end router"). The head-end router must support an Interior Gateway Protocol ("IGP"), such as Open Shortest Path First ("OSPF") or Intermediate System to Intermediate System ("IS-IS"), to determine topology within its routing domain, and must also support the Border Gateway Protocol (BGP) if paths cross Autonomous System ("AS") boundaries. Adding complex path computation can overwhelm the router CPU. In a PCE-based network, head-end routers continue to support IGP and possibly BGP; however, path determination is moved to one or more PCEs. Each PCE is a software component dedicated to computing paths, which may execute in a dedicated server, in a network management server, in a cloud or in a head-end router with sufficient processing resources. PCE depends on a Traffic Engineering Database ("TED") for the information required to create a new path. The TED receives network topology information from routers via standard routing protocols and may also exchange information with other TEDs. A TED may be located in a server along with the PCE component, in a server separate from the PCE, or possibly in a head-end router. In some domains, a single PCE may compute all of the paths for the domain; in other domains, multiple PCEs may interact to compute paths for the domain. Path creation begins when a customer-edge router issues a request to a provider-edge head-end router, which then passes the request to a PCE. PCE Protocol ("PCEP") is used for the interchange between PCEs ore between PCE and Path Computation Client ("PCC"), which can be the provider edge router. PCE can be used for computing path in different ways. For example, a PCC (e.g., router) can request a path from PCE. Once the PCC receives the path from PCE, it can signal the path (e.g., with RSVP-TE) if necessary. This model is referred to as "PCC-Initiated LSP". Note that SR-TE does not require signaling. Alternatively, a PCE may receive a request from a higher application to setup a path. In this case, PCE computes the path and send it to PCC. The path is signaled for RSVP-TE LSPs. This model is referred to as "PCE-initiated LSPs". In the embodiments shown and described herein, PCC is an XR controller.

Figure 3A:
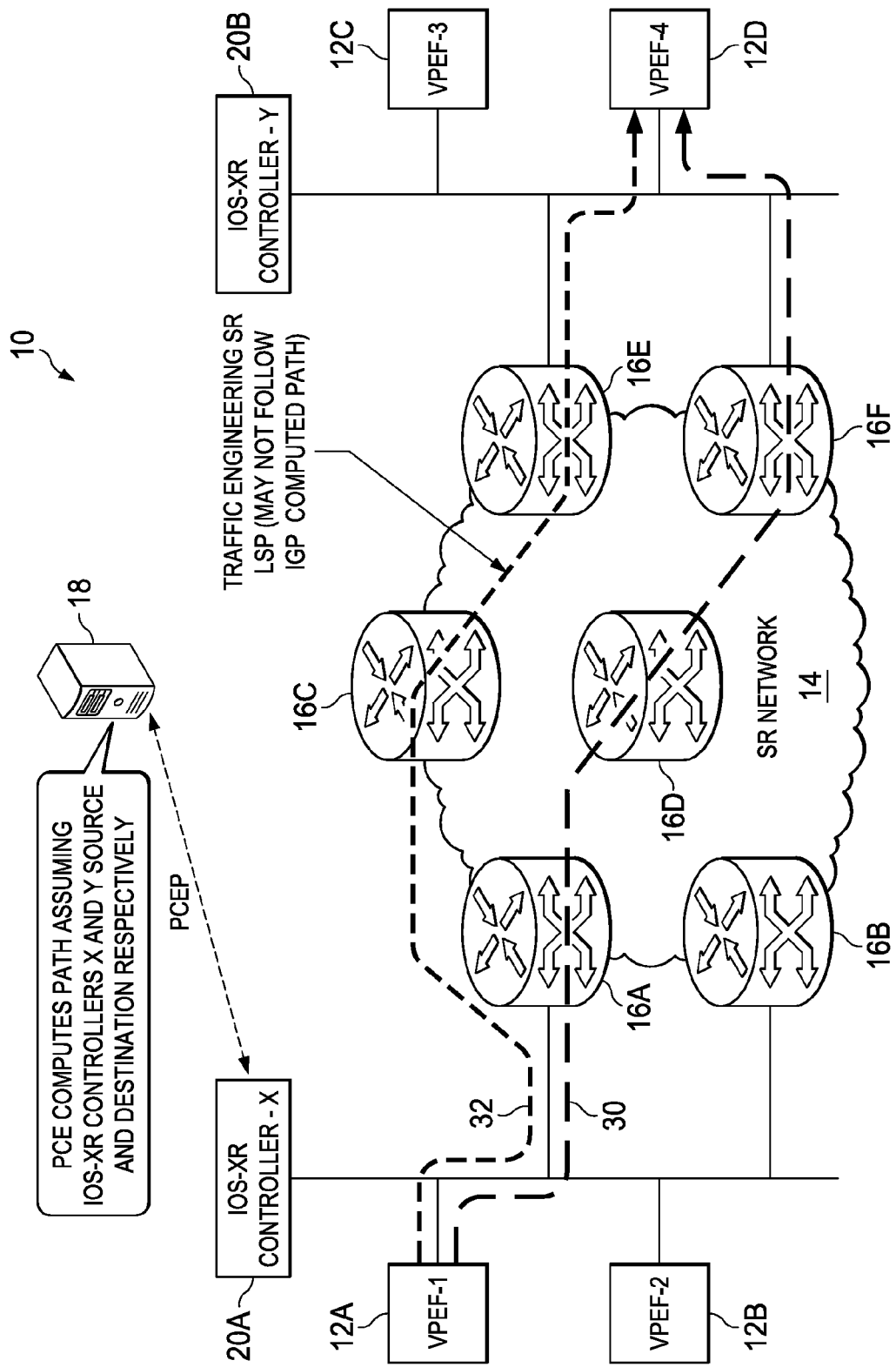
FIG. 3A is a simplified block diagram illustrating SR LSP with centralized path computation as may be implemented in the network environment illustrated in FIG. 1.
Figure 3B:
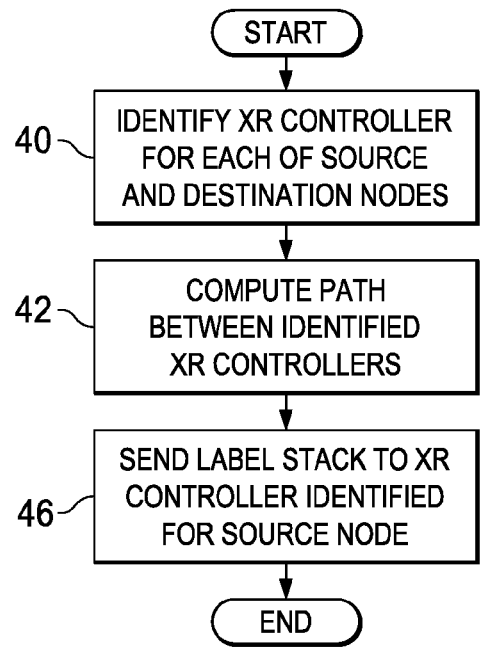
FIG. 3B is a simplified flowchart illustrating example operational steps that may be associated with a controller of the system of FIG. 3A for implementing SR LSP with centralized path routing in accordance with features of embodiments described herein.

Referring now to FIGS. 3A and 3B, PCE executing in the SDN controller 18 computes a path between VPEF 12A and VPEF 12D as illustrated therein and described herein below. In response to a path computation request in which VPEF 12A is the source and VPEF 12D is the destination, in step 40 (FIG. 3B), PCE identifies the XR controllers for VPEFs 12A and 12D, respectively. As a result of this step, XR controller 20A is identified as the "source" and XR controller 20B is identified as the "destination". In step 42, PCE computes a path (which in the embodiment illustrated in FIG. 3A corresponds to SR LSP 32 (FIG. 2)) between the source and destination XR controllers (i.e., XR controllers 20A and 20B). Finally, in step 46, PCE sends the corresponding label stack to the source XR controller (i.e., XR controller 20A) e.g., via PCEP, as represented in FIG. 3A by a dashed line designed by a reference numeral 48. As noted with reference to FIG. 2, the SR-TE LSP 32 may follow a different path through the SR network 14.

Figure 4:
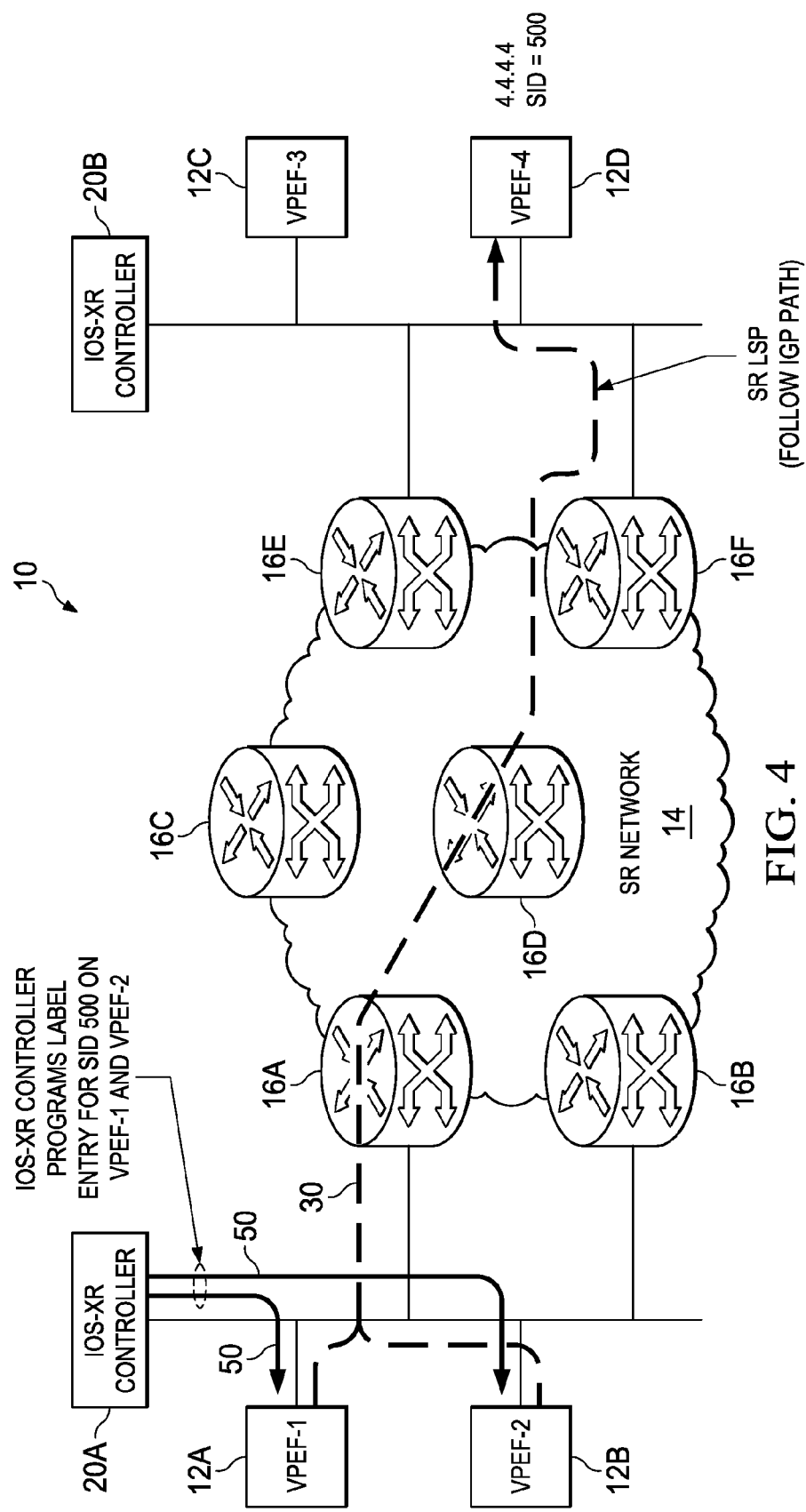
FIG. 4 is a simplified block diagram illustrating programming of MPLS forwarding entries for SR LSP as may be implemented in the network environment illustrated in FIG. 1.

For non-TE LSP SR calculation, each XR controller installs on all of the VPEFs that it controls MPLS label forwarding entries for each known IP prefix learned via IGP. FIG. 4 illustrates this scenario. For example, as shown in FIG. 4, XR controller 20A programs the MPLS label entry for a particular SID (e.g., SID 500) on VPEFs 12A and 12B, as represented in FIG. 4 by arrows designated by a reference numeral 50.

Figure 5:
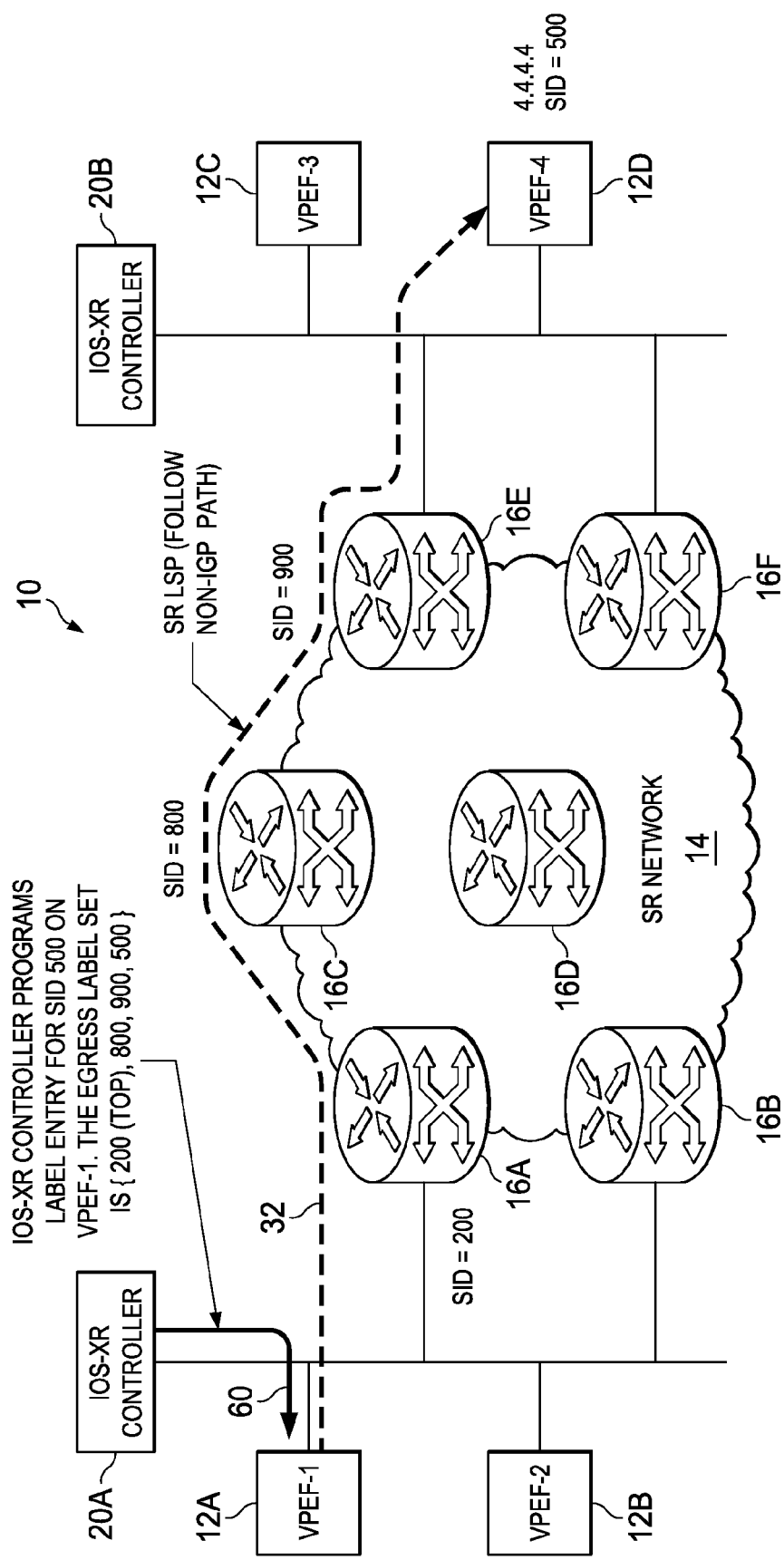
FIG. 5 is a simplified block diagram illustrating programming of MPLS forwarding entries for SR-TE LSP as may be implemented in the network environment illustrated in FIG. 1.

For SR-TE LSPs, each XR controller identifies the source of the SR LSP either from PCE (for PCE-initiated SR LSP) or the operator (for non-PCE-initiated SR LSP). The XR controller then installs an MPLS label forwarding entry on the particular VPEF. For example, as shown in FIG. 5, XR controller 20A installs an MPLS label forwarding entry for the SR-TE LSP 32 on the VPEF 12A (which serves as the origination of the SR LSP in the data plane), as represented in FIG. 5 by an arrow designated by a reference numeral 60. The egress label set for the path as illustrated is {200 (top), 800, 900, 500}.

Figure 6:
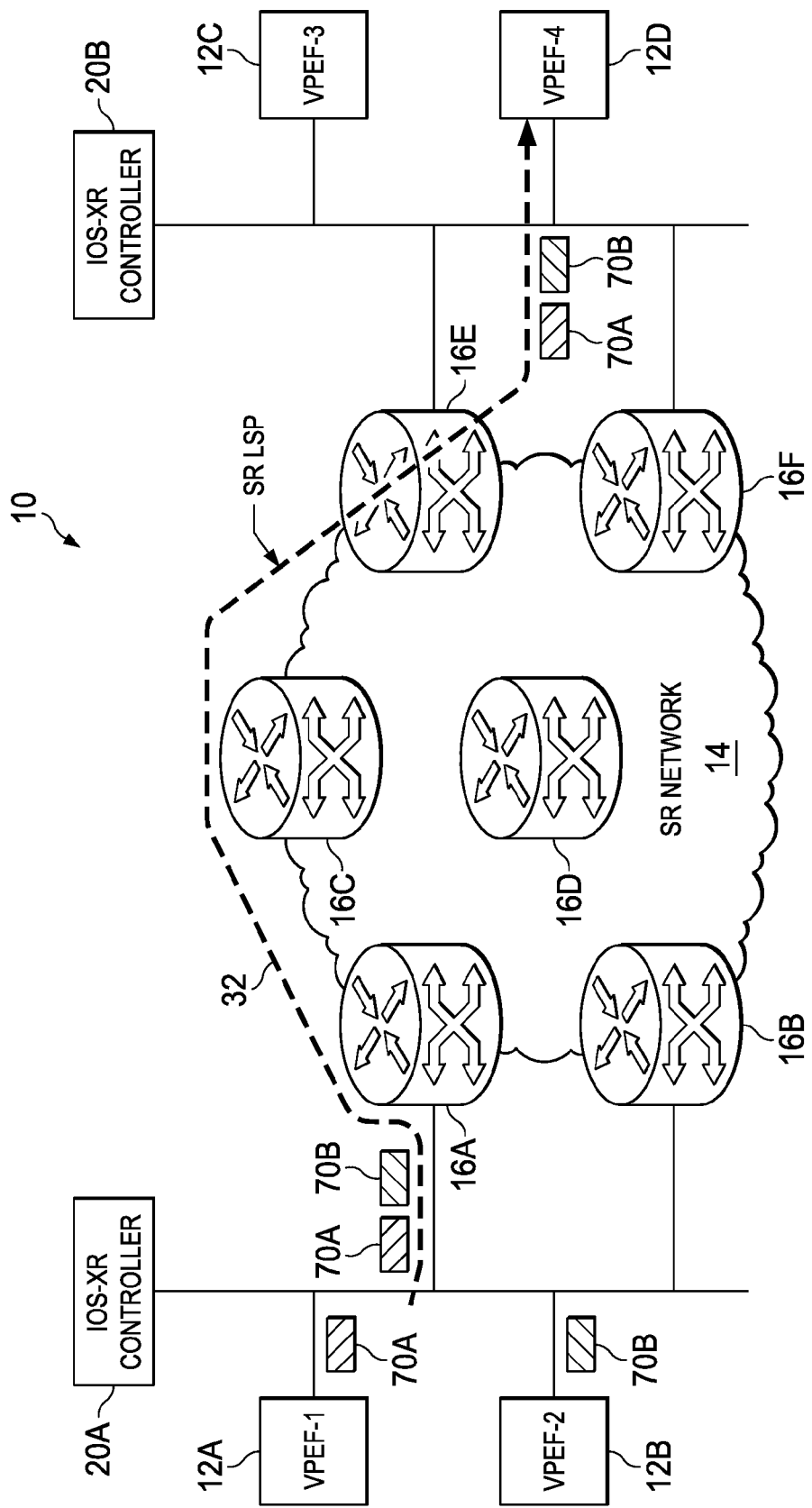
FIG. 6 is a simplified block diagram illustrating use of one SR LSP by multiple forwarding engines as may be implemented in the network environment illustrated in FIG. 1.

It is possible that multiple VPEFs can forward data through the same SR-TE LSP. In this case, the XR controller programs the same forwarding entry on all of the VPEFs that it controls that will be forwarding data through the SR-TE LSP. For PCE initiated TE LSP, if the PCE indicates the address of the XR controller as the source of the SR-TE LSP, then it is assumed that all of the VPEFs associated with the XR controller can forward the data packets through the SR-TE LSP. This means that the same forwarding entry will be installed on all VPEFs associated with the XR controller. For example, referring to FIG. 6, XR controller 20A programs the same forwarding entry on VPEFs 12A, 12B, that will be forwarding data packets 70A, 70B, via non-IGP SR LSP 32.

If the source is an XR controller, it is assumed that the corresponding SR LSP is to be used by all VPEFs managed by the XR controller to transmit data; therefore, MPLS forwarding entries will be installed on all such VPEFs. In the case of SR-TE LSP, label forwarding entries may contain more than one outgoing labels (i.e., a stack of labels). This concept is illustrated in FIG. 5. In the case of SR-TE LSP, each XR controller may create tunnel interfaces in the control plane. All such interfaces are associated only with the XR controller and are not bound to any VPEF(s) managed by the controller; one or many VPEFs can use the tunnel in the data plane if they have traffic destined for the tunnel destination. If entropy label is supported, the XR controller indicates it to be an appropriate source VPEF which computes the value of the entropy label and inserts it into the data.

It will be noted that one of the primary challenges of handling RSVP messages in an NFV network resides on the nodes of the IP/MPLS SR network (which nodes may be referred to herein as "P-nodes") connecting the forwarding engines, or VPEFs. In particular, because the VPEFs do not support control plane functions to process RSVP messages, the messages must be forwarded to the control plane engine, or "XR controller," providing control plane functions to the VPEF when RSPV-TE signaled LSPs originate or terminate on the VPEF.

Figure 7:
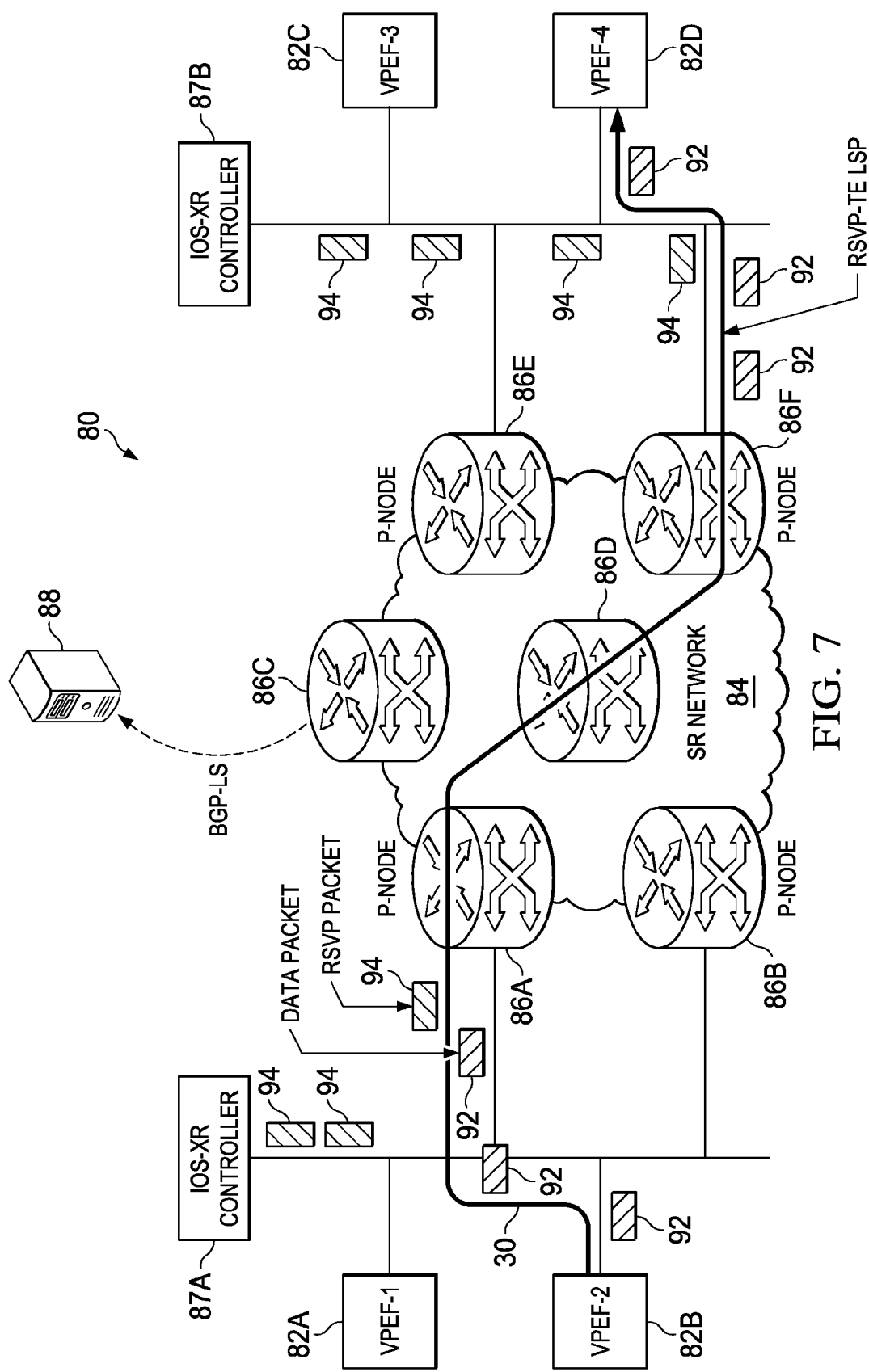
FIG. 7 is a simplified block diagram of an example network environment in which a system for handling RSVP messages in an NFV network may be implemented in accordance with embodiments described herein.

Turning now to FIG. 7, illustrated therein is an NFV network environment 80 comprising a number of forwarding engines, or VPEFs, 82A-82D, interconnected via an SR network 84 comprising a plurality of P-nodes 86A-86F. As with the forwarding engines 12A-12D (FIG. 1), each of forwarding engines 82A-82D implements only forwarding (i.e., data plane) functions; control plane functions for each of the engines are proxied by a respective XR controller 87A, 87B. An SDN controller 88 is provided for learning the topology of the SR network 84 (e.g., via Border Gateway Protocol Link State Distribution or other means) and then providing a path through the network 84 from a source host to a destination host in response to a request from an SDN application, as described above with reference to SDN controller 18 (FIG. 1).

As previously noted, because VPEFs do not support control plane functions required for processing RSVP messages, RSVP messages destined for a VPEF must be forwarded to the XR controller responsible for the VPEF. Referring to FIG. 7, it will be assumed for the sake of an example that an RSVP-TE LSP 90 is established between VPEF 82B (source) and VPEF 82D (destination). As shown in FIG. 7, while data packets 92 may travel directly from VPEF 82B to VPEF 82D, corresponding RSVP packets 94 must originate from the XR controller responsible for VPEF 82B (i.e., XR controller 87A) and terminate on the XR controller responsible for VPEF 82D (i.e., XR controller 87B). This may be accomplished using one of at least two arrangements.

A first arrangement for addressing the challenges of handling RSVP messages in NFV networks requires that the P-node connected to a VPEF must be able to identify the XR-controller handling the VPEF to which RSVP signaling messages are destined (e.g., PATH message to the tail-end VPEF, RESV message to the head-end VPEF). In this arrangement, the XR controller is responsible for advertising the address(es) of the VPEF(s) that it handles. The network node, or P-node, connecting the VPEF typically forwards all packets (data and control) destined for the VPEF directly to the VPEF itself, as opposed to the XR controller that handles the VPEF. It will be recognized, however, that RSVP signaling messages, which are control plane messages, must be sent to the XR controller for processing. In this arrangement, therefore, the P-node identifies RSVP signaling messages for a particular VPEF and, instead of forwarding them to the VPEF, forwards them to the XR controller that handles the VPEF. As previously noted, this arrangement requires each P-node to be aware of the address of the XR controller that advertised the source/destination address of each VPEF. This arrangement further requires each P-node to change the original IP address of RSVP messages received at the P-node from that of a VPEF to that of the XR controller that advertised the IP address of the VPEF. Upon receiving an RSVP packet from the P-node, an XR controller can receive the actual source/destination IP address from RSVP objects within the packet and process the packet accordingly.

Figure 8:
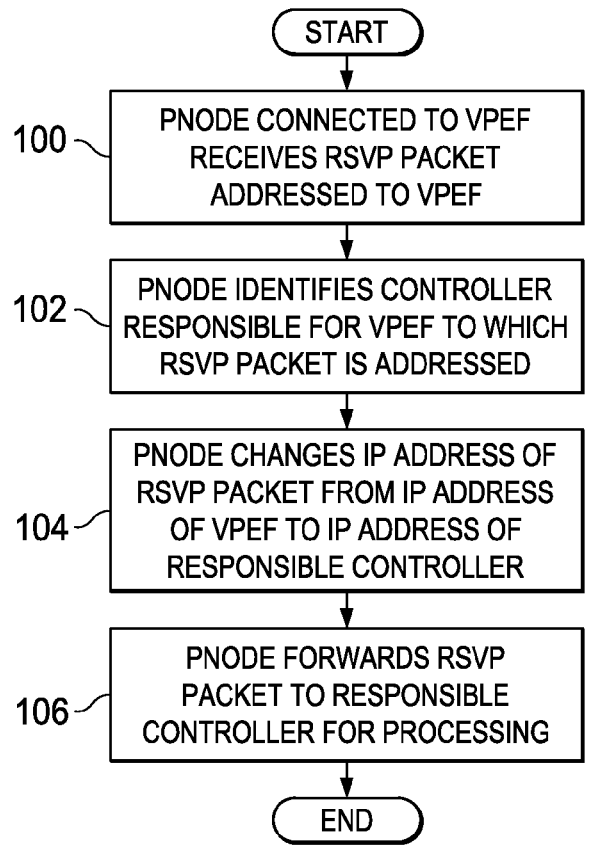
FIG. 8 is a simplified flowchart illustrating example operational steps that may be associated with a P-node of the system of FIG. 7 for handling RSVP messages in an NFV network in accordance with features of embodiments described herein.

FIG. 8 is a flowchart illustrating example operations performed by the P-node in implementing the first arrangement described above. In step 100, a P-node connected to a VPEF receives an RSVP packet addressed to the VPEF. In step 102, the P-node identifies the XR controller responsible for the VPEF. In step 104, the P-node changes the original IP address of the RSVP packet from the IP address of the VPEF to the IP address of the identified XR controller. In step 106, the P-node forwards the RSVP packet to the identified XR controller, where it is processed in a conventional fashion.

In a second arrangement for addressing the challenge of challenges of handling RSVP messages in NFV networks, a P-node that receives an RSVP packet for a particular VPEF forwards the packet to the VPEF itself. In this second arrangement, each VPEF maintains a Generic Routing Encapsulation ("GRE") tunnel to an XR controller that handles (i.e., is responsible for) control plane functions for the VPEF. Upon receiving an RSVP packet from a P-node, the VPEF forwards the packet to the XR controller responsible for the VPEF. Upon receipt of an RSVP packet from a VPEF, the XR controller processes the packet and performs the necessary LSP end point functions. The second arrangement does not require any change in the way RSVP packets are processed on the P-nodes; however, the trade-off is that a GRE tunnel must be maintained between each VPEF and its responsible XR controller, which can be costly.

In summary, the first arrangement described with reference to FIG. 7 requires the P-node to be able to identify RSVP packets destined for a VPEF and to forward those packets to the appropriate XR controller. The second arrangement described with reference to FIG. 7 requires that a GRE tunnel be maintained between each VPEF and the XR controller that handles control plane functions for that VPEF. In both arrangements, the XR controller processes the RSVP packet performs RSVP end-point functions on behalf of the VPEF to which the RSVP packet was originally destined. Additionally, both arrangements enable network operators to establish TE LSPs having end-points the control plane functions of which are virtualized.

Figure 9:
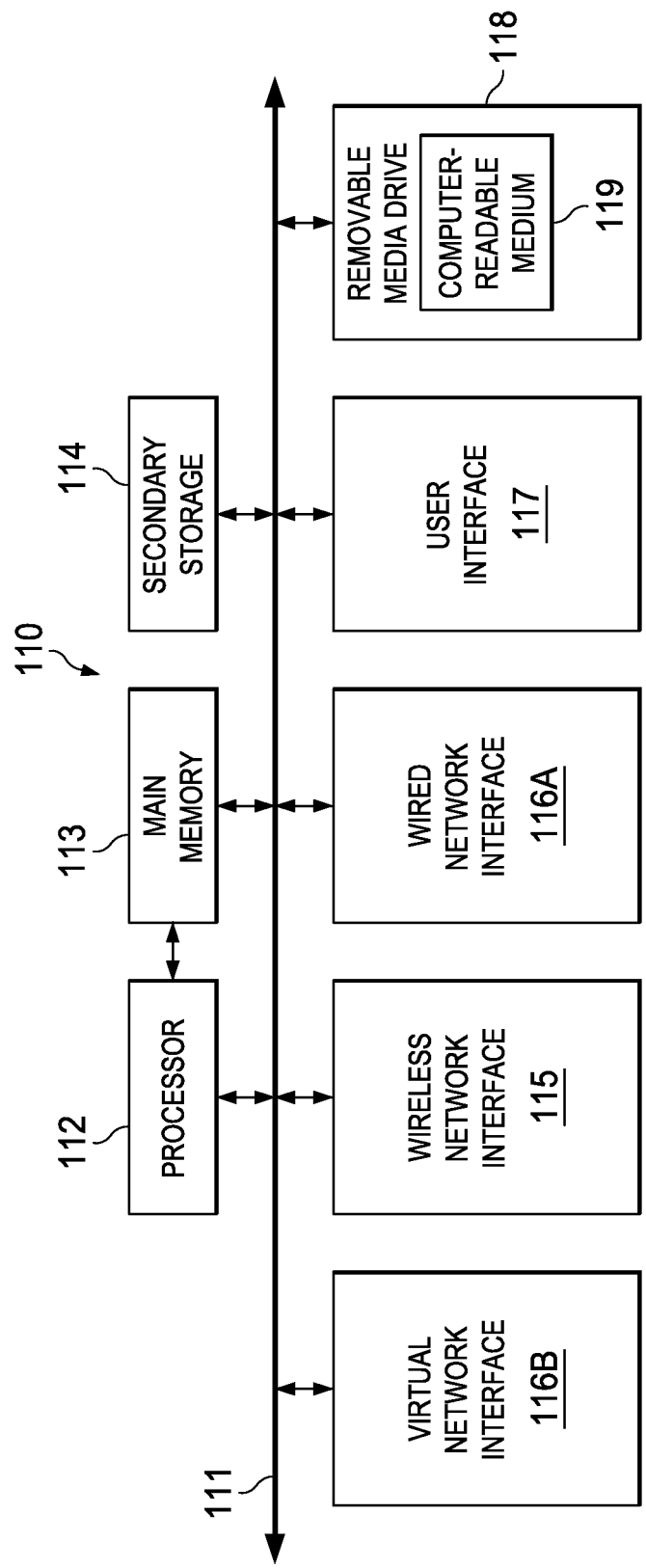
FIG. 9 is a simplified block diagram illustrating components of an example machine capable of executing instructions in a processor in a system for implementing various features of embodiments described herein.

Turning to FIG. 9, illustrated therein is a simplified block diagram of an example machine (or apparatus) 110, which in certain embodiments may comprise a controller, including but not limited to controllers 18, 20A, 20B, or a network node, including but not limited to VPEFs 12A-12D, nodes 16A-16F, that may be implemented in embodiments illustrated in and described with reference to the FIGURES provided herein. The example machine 110 corresponds to network elements and computing devices that may be deployed in environments 10, 80. In particular, FIG. 9 illustrates a block diagram representation of an example form of a machine within which software and hardware cause machine 110 to perform any one or more of the activities or operations discussed herein. As shown in FIG. 9, machine 110 may include a processor 112, a main memory 113, secondary storage 114, a wireless network interface 115, a wired network interface 116A, a virtual network interface 116B, a user interface 117, and a removable media drive 118 including a computer-readable medium 119. A bus 111, such as a system bus and a memory bus, may provide electronic communication between processor 112 and the memory, drives, interfaces, and other components of machine 110. Machine 110 may be a physical or a virtual appliance, for example a virtual router running on a hypervisor or running within a container.

Processor 112, which may also be referred to as a central processing unit ("CPU"), can include any general or special-purpose processor capable of executing machine readable instructions and performing operations on data as instructed by the machine readable instructions. Main memory 113 may be directly accessible to processor 112 for accessing machine instructions and may be in the form of random access memory ("RAM") or any type of dynamic storage (e.g., dynamic random access memory ("DRAM")). Secondary storage 114 can be any non-volatile memory such as a hard disk, which is capable of storing electronic data including executable software files. Externally stored electronic data may be provided to computer 110 through one or more removable media drives 118, which may be configured to receive any type of external media such as compact discs ("CDs"), digital video discs ("DVDs"), flash drives, external hard drives, etc.

Wireless, wired, and virtual network interfaces 115, 116A and 116B can be provided to enable electronic communication between machine 110 and other machines or nodes via networks (e.g., networks 14, 84). In one example, wireless network interface 115 could include a wireless network controller ("WNIC") with suitable transmitting and receiving components, such as transceivers, for wirelessly communicating within a network. Wired network interface 116A can enable machine 110 to physically connect to a network by a wire line such as an Ethernet cable. Both wireless and wired network interfaces 115 and 116A may be configured to facilitate communications using suitable communication protocols such as, for example, Internet Protocol Suite ("TCP/IP"). Machine 110 is shown with both wireless and wired network interfaces 115 and 116A for illustrative purposes only. While one or more wireless and hardwire interfaces may be provided in machine 110, or externally connected to machine 110, only one connection option is needed to enable connection of machine 110 to a network.

A user interface 117 may be provided in some machines to allow a user to interact with the machine 110. User interface 117 could include a display device such as a graphical display device (e.g., plasma display panel ("PDP"), a liquid crystal display ("LCD"), a cathode ray tube ("CRT"), etc.). In addition, any appropriate input mechanism may also be included such as a keyboard, a touch screen, a mouse, a trackball, voice recognition, touch pad, and an application programming interface (API), etc.

Removable media drive 118 represents a drive configured to receive any type of external computer-readable media (e.g., computer-readable medium 119). Instructions embodying the activities or functions described herein may be stored on one or more external computer-readable media. Additionally, such instructions may also, or alternatively, reside at least partially within a memory element (e.g., in main memory 113 or cache memory of processor 112) of machine 110 during execution, or within a non-volatile memory element (e.g., secondary storage 114) of machine 110. Accordingly, other memory elements of machine 110 also constitute computer-readable media. Thus, "computer-readable medium" is meant to include any medium that is capable of storing instructions for execution by machine 110 that cause the machine to perform any one or more of the activities disclosed herein.

Not shown in FIG. 9 is additional hardware that may be suitably coupled to processor 112 and other components in the form of memory management units ("MMU"), additional symmetric multiprocessing ("SMP") elements, physical memory, peripheral component interconnect ("PCI") bus and corresponding bridges, small computer system interface ("SCSI")/integrated drive electronics ("IDE") elements, etc. Machine 110 may include any additional suitable hardware, software, components, modules, interfaces, or objects that facilitate the operations thereof. This may be inclusive of appropriate algorithms and communication protocols that allow for the effective protection and communication of data. Furthermore, any suitable operating system may also be configured in machine 110 to appropriately manage the operation of the hardware components therein.

The elements, shown and/or described with reference to machine 110, are intended for illustrative purposes and are not meant to imply architectural limitations of machines such as those utilized in accordance with the present disclosure. In addition, each machine, may include more or fewer components where appropriate and based on particular needs and may run as virtual machines or virtual appliances. As used herein in this Specification, the term "machine" is meant to encompass any computing device or network element such as servers, virtual servers, logical containers, routers, personal computers, client computers, network appliances, switches, bridges, gateways, processors, load balancers, wireless LAN controllers, firewalls, or any other suitable device, component, element, or object operable to affect or process electronic information in a network environment.

In example implementations, at least some portions of the activities outlined herein may be implemented in software in, for example, forwarding engines 12A-12D, controllers 18, 20A, 20B, and nodes 16A-16D (and corresponding devices illustrated in FIG. 7). In some embodiments, this software could be received or downloaded from a web server, provided on computer-readable media, or configured by a manufacturer of a particular element in order to provide this system for implementing autonomic LISP for enabling a secure hybrid cloud extension in accordance with features of embodiments described herein. In some embodiments, one or more of these features may be implemented in hardware, provided external to these elements, or consolidated in any appropriate manner to achieve the intended functionality.

In one example implementation, forwarding engines 12A-12D, controllers 18, 20A, 20B, and nodes 16A-16D (and corresponding devices illustrated in FIG. 7) are network elements or computing devices, which may be implemented as physical and/or virtual devices and may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

Furthermore, in the embodiments described and shown herein, some of the processors and memory elements associated with the various network elements may be removed, or otherwise consolidated such that a single processor and a single memory location are responsible for certain activities. Alternatively, certain processing functions could be separated and separate processors and/or physical machines could implement various functionalities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of the example embodiments, one or more memory elements (e.g., main memory 113, secondary storage 114, computer-readable medium 119) can store data used for the automatic configuration and registration operations described herein. This includes at least some of the memory elements being able to store instructions (e.g., software, logic, code, etc.) that are executed to carry out the activities described in this Specification. A processor can execute any type of instructions associated with the data to achieve the operations detailed herein in this Specification. In one example, one or more processors (e.g., processor 112) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable read only memory ("EEPROM")), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components of network environment 10 may keep information in any suitable type of memory (e.g., random access memory ("RAM"), read-only memory ("ROM"), erasable programmable ROM ("EPROM"), electrically erasable programmable ROM ("EEPROM"), etc.), software, hardware, or in any other suitable component, device, element, or object where appropriate and based on particular needs. Any of the memory items discussed herein should be construed as being encompassed within the broad term "memory element." The information being read, used, tracked, sent, transmitted, communicated, or received by network environment 10 could be provided in any database, register, queue, table, cache, control list, or other storage structure, all of which can be referenced at any suitable timeframe. Any such storage options may be included within the broad term "memory element" as used herein. Similarly, any of the potential processing elements and modules described in this Specification should be construed as being encompassed within the broad term "processor."

Note that with the numerous examples provided herein, interaction may be described in terms of two, three, four, or more network elements. However, this has been done for purposes of clarity and example only. It should be appreciated that the system can be consolidated in any suitable manner. Along similar design alternatives, any of the illustrated computers, modules, components, and elements of the FIGURES may be combined in various possible configurations, all of which are clearly within the broad scope of this Specification. In certain cases, it may be easier to describe one or more of the functionalities of a given set of flows by only referencing a limited number of network elements. It should be appreciated that embodiments described herein, as shown in the FIGURES, and teachings thereof are readily scalable and can accommodate a large number of components, as well as more complicated/sophisticated arrangements and configurations. Accordingly, the examples provided should not limit the scope or inhibit the broad teachings of the system as potentially applied to a myriad of other architectures.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

In the foregoing description, for purposes of explanation, numerous specific details are set forth in order to provide a thorough understanding of the disclosed embodiments. It will be apparent to one skilled in the art, however, that the disclosed embodiments may be practiced without these specific details. In other instances, structure and devices are shown in block diagram form in order to avoid obscuring the disclosed embodiments. In addition, references in the Specification to "one embodiment", "example embodiment", "an embodiment", "another embodiment", "some embodiments", "various embodiments", "other embodiments", "alternative embodiment", etc. are intended to mean that any features (e.g., elements, structures, modules, components, steps, operations, characteristics, etc.) associated with such embodiments are included in one or more embodiments of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   receiving a request to create a path through a network, wherein the path originates on a first network device and terminates on the second network device;
   identifying a first controller associated with the first network device, wherein the first controller proxies control plane functions for the first network device;
   Identifying a second controller associated with the second network device, wherein the second controller proxies control plane functions for the second network device; and
   computing the path using the first controller as a source and the second controller as a destination;
   wherein the first controller installs the computed path on the first network device and the second controller installs the computed path on the second network device.

2. The method of claim 1, wherein the computed path is a Segment Routed Label Switched Path ("SR LSP") and the first controller installs the computed path on the first network device and any other network device for which it proxies control plane functions by programming thereon Multi-Protocol Label Switching ("MPLS") label forwarding entries for each known Internet Protocol ("IP") prefix learned via Interior Gateway Protocol ("IGP").

3. The method of claim 1, wherein the computed path is a Traffic Engineering Segment Routed Label Switched Path ("SR-TE LSP") and the first controller installs the computed path on the first network device by programming thereon a Multi-Protocol Label Switching ("MPLS") label forwarding entry for the computed path.

4. The method of claim 3, wherein the MPLS label forwarding entry comprises a stack of labels.

5. The method of claim 3, wherein the first controller programs the MPLS label forwarding entry on all network devices for which the first controller proxies control plane functions and through which data may be forwarded on the SR-TE LSP.

6. The method of claim 1, wherein the request comprises a Path Computation Element Protocol ("PCEP") request.

7. The method of claim 1, wherein a network node connected to the first network device receives a resource reservation packet addressed to the first network device, the method further comprising:
   identifying that the first controller is associated with the first network device;
   updating the received resource reservation packet to change an IP address included in the resource reservation packet from an IP address of the first network device to an IP address of the first controller; and
   forwarding the updated resource reservation packet to the first controller for processing.

8. The method of claim 1, further comprising:
   maintaining a tunnel between the first network device and the first controller;
   receiving by the first network device a resource reservation packet addressed to the first network device; and
   forwarding the received resource reservation packet from the first network device to the first controller for processing.

9. One or more non-transitory tangible media that includes code for execution and when executed by a processor is operable to perform operations comprising:
   receiving a request to create a path through a network, wherein the path originates on a first network device and terminates on the second network device;
   identifying a first controller associated with the first network device, wherein the first controller proxies control plane functions for the first network device;
   Identifying a second controller associated with the second network device, wherein the second controller proxies control plane functions for the second network device; and
   computing the path using the first controller as a source and the second controller as a destination;
   wherein the first controller installs the computed path on the first network device and the second controller installs the computed path on the second network device.

10. The media of claim 9, wherein the computed path is a Segment Routed Label Switched Path ("SR LSP") and the first controller installs the computed path on the first network device and any other network device for which it proxies control plane functions by programming thereon Multi-Protocol Label Switching ("MPLS") label forwarding entries for each known Internet Protocol ("IP") prefix learned via Interior Gateway Protocol ("IGP").

11. The media of claim 9, wherein the computed path is a Traffic Engineering Segment Routed Label Switched Path ("SR-TE LSP") and the first controller installs the computed path on the first network device by programming thereon a Multi-Protocol Label Switching ("MPLS") label forwarding entry for the computed path.

12. The media of claim 11, wherein the first controller programs the MPLS label forwarding entry on all network devices for which the first controller proxies control plane functions and through which data may be forwarded on the SR-TE LSP.

13. The media of claim 9, wherein a network node connected to the first network device receives a resource reservation packet addressed to the first network device, the operations further comprising:
   identifying that the first controller is associated with the first network device;
   updating the received resource reservation packet to change an IP address included in the resource reservation packet from an IP address of the first network device to an IP address of the first controller; and
   forwarding the updated resource reservation packet to the first controller for processing.

14. The media of claim 9, wherein the operations further comprise:
   maintaining a tunnel between the first network device and the first controller;
   receiving by the first network device a resource reservation packet addressed to the first network device; and
   forwarding the received resource reservation packet from the first network device to the first controller for processing.

15. An apparatus comprising:
   a memory element configured to store data; and
   a processor operable to execute instructions associated with the data;
   wherein the apparatus is configured to:
      receive a request to create a path through a network, wherein the path originates on a first network device and terminates on the second network device;
      identify a first controller associated with the first network device, wherein the first controller proxies control plane functions for the first network device;
      identify a second controller associated with the second network device, wherein the second controller proxies control plane functions for the second network device; and
      compute the path using the first controller as a source and the second controller as a destination;
   wherein the first controller installs the computed path on the first network device and the second controller installs the computed path on the second network device.

16. The apparatus of claim 15, wherein the computed path is a Segment Routed Label Switched Path ("SR LSP") and the first controller installs the computed path on the first network device and any other network device for which it proxies control plane functions by programming thereon Multi-Protocol Label Switching ("MPLS") label forwarding entries for each known Internet Protocol ("IP") prefix learned via Interior Gateway Protocol ("IGP").

17. The apparatus of claim 15, wherein the computed path is a Traffic Engineering Segment Routed Label Switched Path ("SR-TE LSP") and the first controller installs the computed path on the first network device by programming thereon a Multi-Protocol Label Switching ("MPLS") label forwarding entry for the computed path.

18. The apparatus of claim 17, wherein the first controller programs the MPLS label forwarding entry on all network devices for which the first controller proxies control plane functions and through which data may be forwarded on the SR-TE LSP.

19. The apparatus of claim 15, wherein a network node connected to the first network device receives a resource reservation packet addressed to the first network device, the apparatus further configured to:
   identify that the first controller is associated with the first network device;
   update the received resource reservation packet to change an IP address included in the resource reservation packet from an IP address of the first network device to an IP address of the first controller; and
   forward the updated resource reservation packet to the first controller for processing.

20. The apparatus of claim 15, wherein the apparatus further is configured to:
   maintain a tunnel between the first network device and the first controller;
   receive by the first network device a resource reservation packet addressed to the first network device; and
   forward the received resource reservation packet from the first network device to the first controller for processing.

* * * * *